US008411982B2

(12) United States Patent
Chen

(10) Patent No.: US 8,411,982 B2
(45) Date of Patent: Apr. 2, 2013

(54) UNIVERSAL BLURRINESS MEASUREMENT APPROACH FOR DIGITAL IMAGERY

(75) Inventor: Chunhua Chen, Matawan, NJ (US)

(73) Assignee: Dialogic Corporation, Montreal, Quebec (CA)

( * ) Notice: Subject to any disclaimer, the term of this patent is extended or adjusted under 35 U.S.C. 154(b) by 660 days.

(21) Appl. No.: 12/706,165

(22) Filed: Feb. 16, 2010

(65) Prior Publication Data

US 2011/0200268 A1    Aug. 18, 2011

(51) Int. Cl.
G06K 9/40    (2006.01)
(52) U.S. Cl. .................................. 382/255; 382/309
(58) Field of Classification Search .................. 382/255, 382/309
See application file for complete search history.

(56) References Cited

U.S. PATENT DOCUMENTS

| 7,181,082 | B2 * | 2/2007 | Feng | 382/255 |
|---|---|---|---|---|
| 7,653,256 | B2 * | 1/2010 | Kanda et al. | 382/255 |
| 2005/0231603 | A1 * | 10/2005 | Poon | 348/208.99 |
| 2005/0244077 | A1 * | 11/2005 | Kitamura et al. | 382/261 |
| 2007/0071346 | A1 * | 3/2007 | Li et al. | 382/254 |
| 2008/0309777 | A1 * | 12/2008 | Aoyama | 348/222.1 |
| 2009/0080756 | A1 * | 3/2009 | Chang et al. | 382/132 |
| 2010/0002929 | A1 * | 1/2010 | Sammak et al. | 382/133 |
| 2011/0200268 | A1 * | 8/2011 | Chen | 382/255 |

FOREIGN PATENT DOCUMENTS

WO    WO 2009146297 A1 * 12/2009

OTHER PUBLICATIONS

Chunhua Chen, Wen Chen, and Jeffrey A. Bloom, "A Universal, Reference-Free Blurriness Measure," Image Quality and System Performance VIII, Susan P. Farnand and Frans Gaykema, Editors, Proc. SPIE 7867 (2011), p. 1-15.*
Yun Q. Shi, Chunhua Chen and Wen Chen, "A Markov Process Based Approach to Effective Attacking JPEG Steganography", 2006, Conference on Information Hiding, p. 249-264.*
M.Chen and A.C. Bovik, "No-Reference Image Blur Assessment using Multiscale Gradient," IEEE First International Workshop on Quality of Multimedia Experience, San Diego, California, USA, Jul. 2009.
R. Liu, Z. Li, and J. Jia, Image Partial Blur Detection and Classification, IEEE Computer Society Conference on Computer Vision and Pattern Recognittion, Anchrage Alaska, USA, Jun. 2008.
Kevin Bailly, Maurice Milgram "Boosting feature selection for Neural Network based regression", Institut des Systemes Intelligents et de Robotique, Universite Pierre et Marie Curie-Paris 6, CNRS, UMR 7222, 4 Place Jussieu, 75005 Paris, France, © 2009 Elsevier Ltd.

* cited by examiner

*Primary Examiner* — Claire X Wang
*Assistant Examiner* — Gandhi Thirugnanam
(74) *Attorney, Agent, or Firm* — Preti Flaherty Beliveau & Pachios LLP

(57) ABSTRACT

Systems and methods of performing quantitative measurements of image blur in digital images and digital image sequences that are computationally efficient, and that employ no reference information in the measurement process. Each of the image blur measurements is performed using a Markov Chain, where a gradient image array is calculated for a pixel array derived from a given digital image, and a transition probability matrix is constructed for the transition probabilities between adjacent elements in the gradient image array. The transition probability data contained in the transition probability matrix can be pooled or otherwise accumulated to obtain a quantitative measurement of image blur in the given digital image.

21 Claims, 7 Drawing Sheets

UNIVERSAL BLURRINESS MEASUREMENT APPROACH FOR DIGITAL IMAGERY

CROSS REFERENCE TO RELATED APPLICATIONS

Not applicable

STATEMENT REGARDING FEDERALLY SPONSORED RESEARCH OR DEVELOPMENT

Not applicable

FIELD OF THE INVENTION

The present application relates generally to systems and methods of measuring image blur in digital images and digital image sequences, and more specifically to systems and methods of performing quantitative measurements of image blur in digital images and digital image sequences that are computationally efficient, and that employ no reference information in the measurement process.

BACKGROUND OF THE INVENTION

Image blur is a significant factor in assessing the perceptual quality of digital images. For example, when using a digital camera to capture digital still images, or a digital camera or digital recording device to capture digital image sequences, image blur can result from the camera or recording device lenses not being properly focused on the subject of the image or image sequence, aberrations in the camera or recording device lenses, aperture blur in the foreground and/or the background of the image or image sequence, the relative motion between the camera or recording device and the subject of the image or image sequence, atmospheric haze, etc. Image blur in digital images can also result from the attenuation of high spatial frequencies caused by digital filtering or block discrete cosine transform (BDCT) based image compression processes. For example, image blur in digital still images compressed according to the Joint Photographic Experts Group (JPEG) standards, and in digital image sequences compressed according to the Moving Picture Experts Group (MPEG) or Telecommunication Standardization Sector of the International Telecommunication Union (ITU-T) H.26n standards, can be caused by quantization which typically follows the BDCT and truncates the high frequency discrete cosine transform (DCT) coefficients. Such loss of high frequency DCT coefficients in the image compression process can appear as image blur in the JPEG images and MPEG or ITU-T H.26n image sequences.

One known technique for measuring image blur in digital images is performed in the spatial domain. This technique typically detects one or more sharp edges in a digital image, and employs pixels in the detected sharp edges to measure the spread of each edge pixel. These measurements are subsequently used to estimate the amount of image blur in the digital image. This technique has drawbacks, however, in that the digital image may not contain any edges sharp enough to estimate image blur with a high level of accuracy.

Another known technique makes some assumptions about the edges in the image when estimating the amount of image blur. However, this technique has also drawbacks, notably, that relying on assumptions about the edges in a digital image when estimating the amount of image blur can further reduce the accuracy of the blur estimate.

Still another known technique employs the local power spectrum of a digital image in the frequency domain to provide a measurement of image blur. In accordance with this technique, an assumption is made that, compared to the local power spectrum of a non-blurred digital image, the local power spectrum of a blurred digital image typically falls more rapidly as the frequency increases. Such techniques for estimating image blur in digital images from the power spectrum of the image also have drawbacks, however, due to their high computational complexity.

Yet another known technique for measuring image blur in digital images includes processing the image data using a DCT to produce a plurality of DCT coefficients—including a number of non-zero DCT coefficients—and generating a weighted occurrence histogram of all of the non-zero DCT coefficients. The amount of image blur in the digital image is then estimated from the weighted occurrence histogram. However, like the technique described above that estimates image blur in a digital image from the power spectrum of the image, this technique for estimating image blur from the weighted occurrence histogram also suffers from a high level of computational complexity.

It would therefore be desirable to have systems and methods of measuring image blur in digital images and digital image sequences that avoid one or more of the drawbacks of known techniques for measuring image blur in digital images and digital image sequences.

BRIEF SUMMARY OF THE INVENTION

In accordance with the present application, systems and methods of performing quantitative measurements of image blur in a given digital image from a plurality of digital images and/or a digital image sequence are disclosed that are computationally efficient, and that employ no reference information in the measurement process. In the presently disclosed systems and methods, an image blur measurement is performed using a Markov Chain, where a gradient image array is calculated for a pixel array derived from a given digital image, and a transition probability matrix is constructed for the transition probabilities between adjacent elements in the gradient image array. The transition probability data contained in the transition probability matrix can be pooled or otherwise accumulated to obtain a quantitative measurement of image blur in the given digital image.

In accordance with one aspect, a system for performing quantitative measurements of image blur in digital images and digital image sequences includes a plurality of functional components operative to perform corresponding functionalities, including generating a 2-dimensional image pixel array from at least one selected component of a given digital still image or single digital image of an image sequence, calculating, from the image pixel data, at least one 2-dimensional gradient image array with reference to at least one specified gradient direction relative to the image pixel array, constructing at least one transition probability matrix from the gradient image data, pooling or accumulating the transition probability data contained in the transition probability matrix to obtain a quantitative measurement of image blur in the given digital image, and generating an output indication of the image blur measurement. In accordance with one exemplary aspect, the 2-dimensional image pixel array is generated from the luminance component of the given digital image. The gradient image array can be calculated in a vertical gradient direction by taking the difference between the luminance values of selected vertically adjacent pairs of pixels in the image pixel array, thereby producing what is referred herein as a "vertical gradient image array". The gradient image array can also be calculated in a horizontal gradient direction by taking the difference between the luminance values of selected horizontally adjacent pairs of pixels in the image pixel array, thereby producing what is referred to herein as a "horizontal gradient image array". In accordance with another exemplary aspect, the bit depth is 8, and therefore each luminance value is an integer value in the range of 0 to 255, and each element of the vertical or horizontal gradient image array can have an integer value in the range of −255 to +255.

Using the vertical (or horizontal) gradient image data, the transition probability matrix can be constructed for the transition probabilities of elements in the vertical (or horizontal) gradient image array being equal to respective specified values (each referred to herein as a "current state" of the system), while selected vertically (or horizontally) adjacent elements in the vertical (or horizontal) gradient image array are equal to the same or different specified values (each referred to herein as a "next state" of the system). For example, the elements in a first column of the transition probability matrix constructed from the vertical (or horizontal) gradient image data can include the probability that the current state of the system is equal to −255 while the next state of the system is equal to −255, the probability that the current state of the system is equal to −254 while the next state of the system is equal to −255, the probability that the current state of the system is equal to −253 while the next state of the system is equal to −255, and so on, to the probability that the current state of the system is equal to 255 while the next state of the system is equal to −255. Further, the elements in a second column of the transition probability matrix can include the probability that the current state of the system is equal to −255 while the next state of the system is equal to −254, the probability that the current state of the system is equal to −254 while the next state of the system is equal to −254, the probability that the current state of the system is equal to −253 while the next state of the system is equal to −254, and so on, to the probability that the current state of the system is equal to 255 while the next state of the system is equal to −254.

Moreover, the elements in a third column of the transition probability matrix constructed from the vertical (or horizontal) gradient image data can include the probability that the current state of the system is equal to −255 while the next state of the system is equal to −253, the probability that the current state of the system is equal to −254 while the next state of the system is equal to −253, the probability that the current state of the system is equal to −253 while the next state of the system is equal to −253, and so on, to the probability that the current state of the system is equal to 255 while the next state of the system is equal to −253. The elements in the subsequent columns of the transition probability matrix can be determined accordingly. Specifically, the elements in the final column of the transition probability matrix can include the probability that the current state of the system is equal to −255 while the next state of the system is equal to 255, the probability that the current state of the system is equal to −254 while the next state of the system is equal to 255, the probability that the current state of the system is equal to −253 while the next state of the system is equal to 255, and so on, to the probability that the current state of the system is equal to 255 while the next state of the system is equal to 255. Because each element of the vertical or horizontal gradient image array can have an integer value in the range of −255 to +255, the dimensions of each of the transition probability matrices constructed from the vertical and horizontal gradient image arrays can be 511×511.

In the vertical (or horizontal) gradient image array, vertically (or horizontally) adjacent elements are correlated to each other, with the strength of the correlation decreasing as the distance between the respective elements increases. Further, due to the perceived spreading of edges in a blurred digital image, the positive-valued elements of a gradient image array calculated from the pixel data of the blurred digital image will tend to have an increased number of adjacent elements with positive values, while the negative-valued elements of the gradient image array will tend to have an increased number of adjacent elements with negative values. As a result, in a transition probability matrix constructed from the gradient image data, the transition probability between the current state and the next state of the system will tend to increase where the current state and the next state both have positive values or negative values. This increase in transition probability correlates with the degree of image blur in the blurred digital image.

In accordance with another exemplary aspect, the functional components implemented in the presently disclosed system are further operative to perform any suitable regression analysis technique to pool the transition probability data contained in the transition probability matrix. In this way, the presently disclosed system can determine the relationship between some subjective assessment of the image blur in the given digital image and the transition probabilities in the transition probability matrix, and obtain a quantitative measurement of image blur in the given digital image based at least in part on that determined relationship. To reduce computational complexity, the functional components are further operative to perform any suitable feature selection technique for removing any possibly irrelevant and/or redundant transition probability data from the transition probability matrix, as appropriate, before performing the regression analysis.

By performing the measurement of image blur in a given digital image using a Markov Chain, where a gradient image array is calculated for a pixel array derived from the given digital image, and a transition probability matrix is constructed for the transition probabilities between adjacent elements in the gradient image array, a quantitative measurement of image blur in the given digital image can be obtained by pooling or accumulating the transition probability data contained in the transition probability matrix. The resulting image blur measurement can be obtained in a computationally efficient manner, without employing any reference information in the measurement process.

Other features, functions, and aspects of the invention will be evident from the Drawings and/or the Detailed Description of the Invention that follow.

BRIEF DESCRIPTION OF THE SEVERAL VIEWS OF THE DRAWINGS

The invention will be more fully understood with reference to the following Detailed Description of the Invention in conjunction with the drawings of which.

DETAILED DESCRIPTION OF THE INVENTION

Systems and methods of performing quantitative measurements of image blur in digital images and digital image sequences are disclosed that are computationally efficient, and that employ no reference information in the measurement process. The presently disclosed systems and methods are operative to perform an image blur measurement using a Markov Chain, where a gradient image array is calculated for a pixel array derived from a given digital image, and a transition probability matrix is constructed for the transition probabilities between adjacent elements in the gradient image array. The transition probability data contained in the transition probability matrix can be pooled or otherwise accumulated to obtain a quantitative measurement of image blur in the given digital image.

Figure 1:
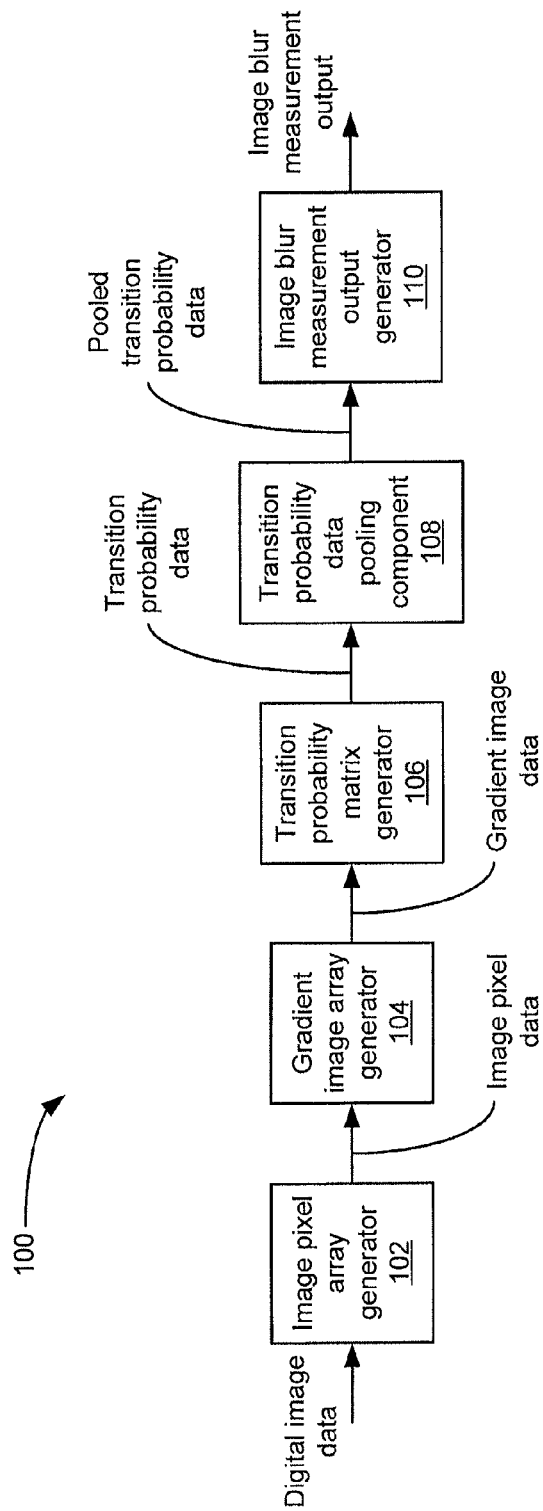
FIG. 1 is a block diagram of an exemplary system for performing quantitative measurements of image blur in digital images and digital image sequences, according to an exemplary embodiment of the present application.

FIG. 1 depicts an illustrative embodiment of an exemplary system 100 for performing quantitative measurements of image blur in digital images and digital image sequences, in accordance with the present application. In accordance with the illustrated embodiment, the system 100 has a plurality of functional components, including an image pixel array generator 102, a gradient image array generator 104, a transition probability matrix generator 106, a transition probability data pooling component 108, and an image blur measurement output generator 110. As shown in FIG. 1, the image pixel array generator 102 receives digital image data from a given digital image, which can be a digital still image or a single digital image of an image sequence. For example, the digital still image may conform to the Joint Photographic Experts Group (JPEG) standards or any other suitable coding/compression standard, and the single digital image of the image sequence may conform to the Moving Picture Experts Group (MPEG) or Telecommunication Standardization Sector of the International Telecommunication Union (ITU-T) H.26n standards or any other suitable coding/compression standard. The digital image data is derived from at least one component of the digital image, such as the luminance component Y, the chrominance component U, the chrominance component V, the chrominance component Cb, and/or the chrominance component Cr. The image pixel array generator 102 generates at least one 2-dimensional image pixel array containing image pixel data from the digital image data, where each image pixel array is generated from a respective component Y, U, V, Cb, or Cr of the given digital image.

As further shown in FIG. 1, the image pixel array generator 102 provides the image pixel data to the gradient image array generator 104, which calculates at least one gradient image array containing gradient image data from the image pixel data. The gradient image array generator 104 calculates each gradient image array with reference to a specified gradient direction (e.g., vertical, horizontal, main diagonal, or minor diagonal) relative to the respective image pixel array. An exemplary process of calculating a gradient image array with reference to a vertical gradient direction relative to a given image pixel array is described below with reference to FIG. 4. The gradient image array generator 104 provides the gradient image data to the transition probability matrix generator 106, which constructs at least one transition probability matrix containing transition probability data from the gradient image data. An exemplary process of constructing a transition probability matrix from vertical gradient image data is described below with reference to FIG. 5, and an exemplary transition probability matrix constructed from the vertical gradient image data is described below with reference to FIG. 6.

The transition probability matrix generator 106 provides the transition probability data to the transition probability data pooling component 108, which pools the transition probability data, and provides the pooled transition probability data to the image blur measurement output generator 110. For example, the transition probability data pooling component 108 may employ a regression analysis technique, or any other suitable technique of pooling or accumulating data. Further, to reduce the computational complexity of the regression analysis, the transition probability data pooling component 108 may employ any suitable feature selection technique for removing any possibly irrelevant and/or redundant elements from the transition probability matrix, as appropriate. The image blur measurement output generator 110 generates a quantitative measurement of image blur in the digital image from the pooled or accumulated transition probability data, and provides an indication of the image blur measurement as output.

The presently disclosed systems and methods of performing quantitative measurements of image blur in digital images and digital image sequences will be better understood with reference to the following illustrative example and FIGS. 2-6. In this illustrative example, a 2-dimensional image pixel array is generated from the luminance component Y of a given digital image, and a gradient image array is calculated with reference to a vertical gradient direction relative to the image pixel array to produce what is referred to herein as a "vertical gradient image array". It is noted, however, that in accordance with one or more alternative embodiments, one or more 2-dimensional image pixel arrays may be generated from the luminance component Y, the chrominance component U, the chrominance component V, the chrominance component Cb, and/or the chrominance component Cr of the given digital image, and one or more gradient image arrays may be calculated with reference to the vertical gradient direction, the horizontal gradient direction, the main diagonal gradient direction, and/or the minor diagonal direction, among others, relative to the image pixel array.

Figure 2:
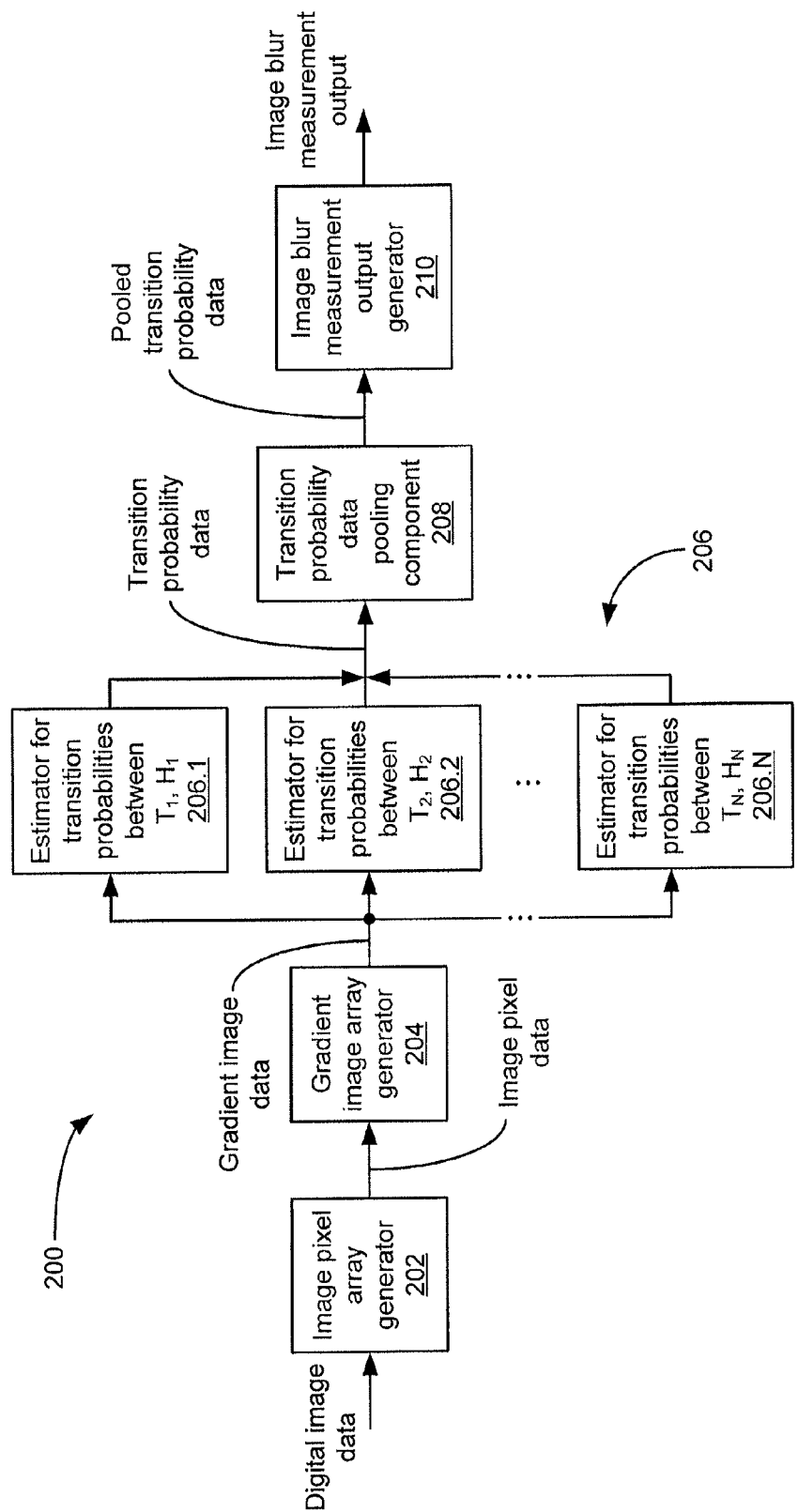
FIG. 2 is a block diagram of the system of FIG. 1, including functional components for generating an exemplary image pixel array from a selected component of a given digital image, for calculating an exemplary vertical gradient image array from the image pixel data, and for constructing an exemplary transition probability matrix from the vertical gradient image data.

Also in accordance with this illustrative example, an exemplary system 200 (see FIG. 2) for performing quantitative measurements of image blur in digital images and digital image sequences has a plurality of functional components, including an image pixel array generator 202, a gradient image array generator 204, a transition probability matrix generator 206, a transition probability data pooling component 208, and an image blur measurement output generator 210. It is noted that the functional components 202, 204, 206, 208, and 210 of FIG. 2 can perform the same functionalities as the functional components 102, 104, 106, 108, and 110, respectively, described above with reference to FIG. 1. As shown in FIG. 2, the image pixel array generator 202 receives digital image data, which is derived from the luminance component Y of the given digital image. Further, the image pixel array generator 202 generates a 2-dimensional image pixel array containing image pixel data from the luminance component Y of the given digital image.

Figure 3:
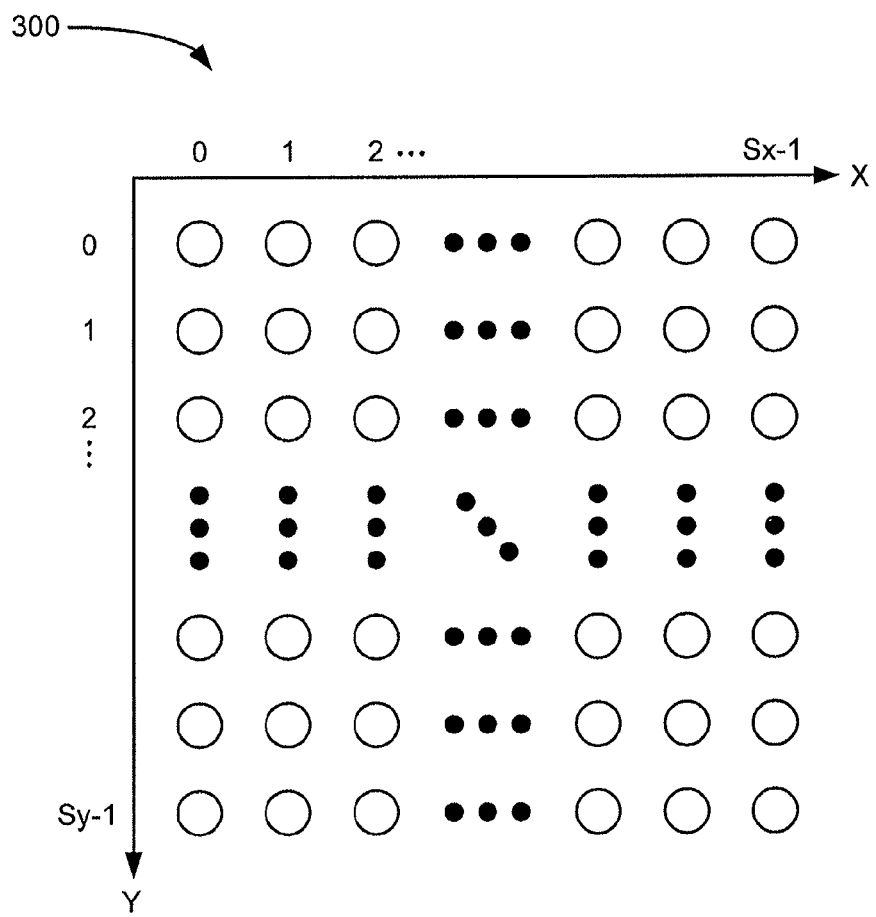
FIG. 3 is a diagram of the exemplary image pixel array generated by the systems of FIGS. 1 and 2.

FIG. 3 depicts an exemplary 2-dimensional image pixel array 300 generated by the image pixel array generator 202 of FIG. 2. As shown in FIG. 3, the 2-dimensional image pixel array 300 is depicted relative to the horizontal coordinate axis x (the "x-axis") and the vertical coordinate axis y (the "y-axis"). Accordingly, in this example, the image pixel array 300 can be denoted as "I(x,y)", where $0 \leq x \leq (Sx-1)$, $0 \leq y \leq (Sy-1)$, "Sx" is the width in pixels along the x-axis of a frame containing the given digital image, and "Sy" is the height in pixels along the y-axis of the frame containing the given digital image.

Figure 4:
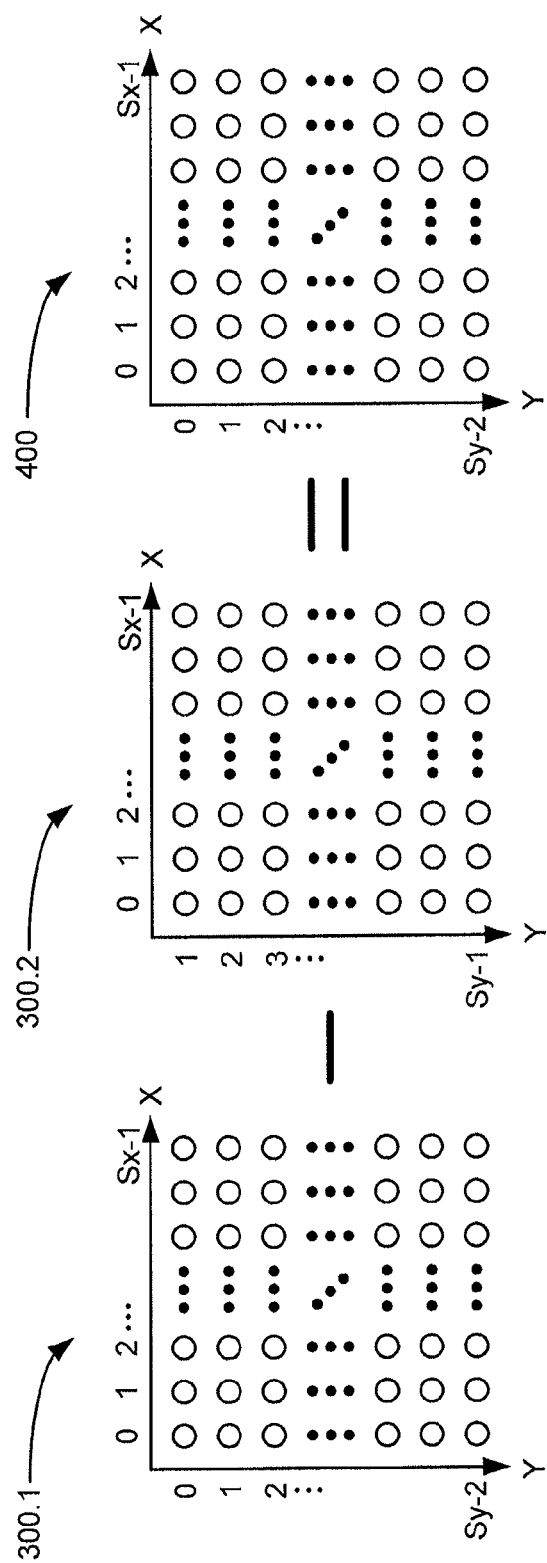
FIG. 4 is a diagram of image pixel arrays illustrating a process of calculating the exemplary vertical gradient image array from the image pixel data of FIG. 3, using the systems of FIGS. 1 and 2.
Figure 5:
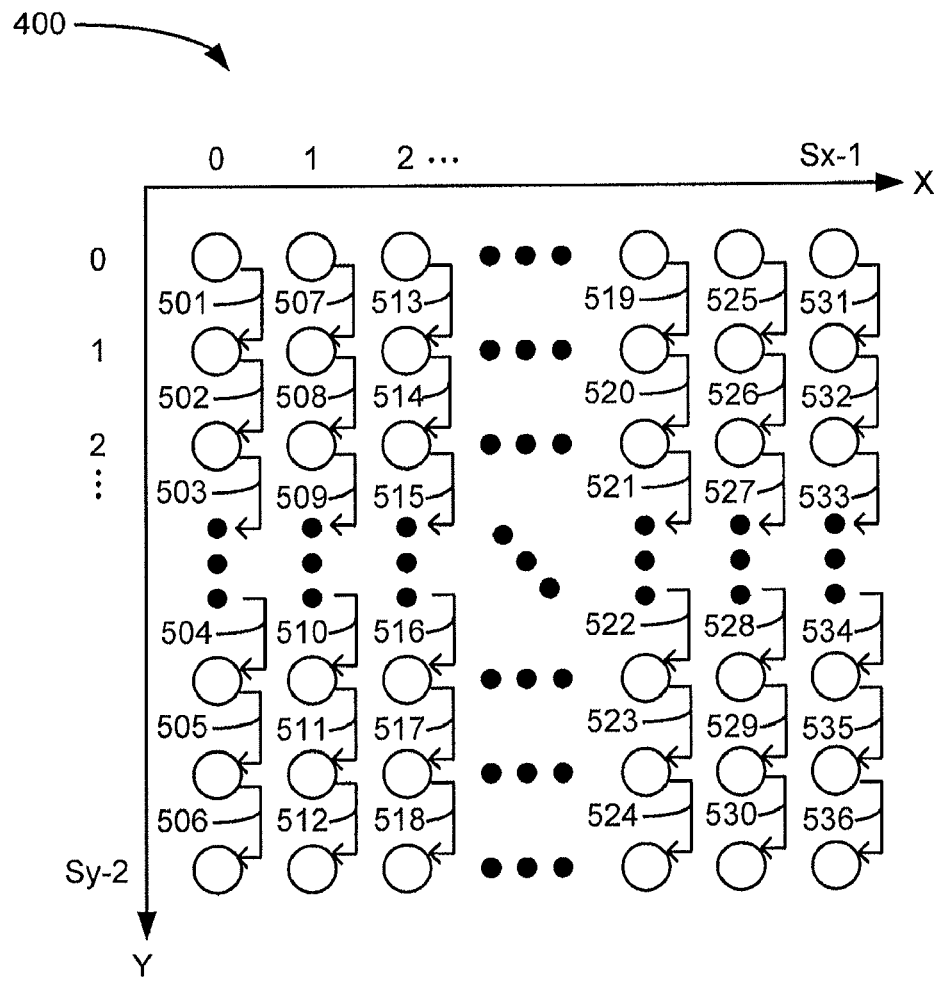
FIG. 5 is a diagram of an image pixel array illustrating a process of constructing the exemplary transition probability matrix from the vertical gradient image data of FIG. 4, using the systems of FIGS. 1 and 2.

The gradient image array generator 204 (see FIG. 2) calculates a gradient image array with reference to the vertical gradient direction relative to the image pixel array 300 (see FIG. 3), thereby producing a vertical gradient image array 400 (see FIG. 4). In this example, the gradient image array generator 204 produces the vertical gradient image array 400 by taking the difference between the luminance values Y of vertically adjacent pairs of pixels in the image pixel array 300. Specifically, as shown in FIG. 4, the pixels contained in the image pixel array 300 can be arranged as a 2-dimensional image pixel array 300.1, and as a 2-dimensional image pixel array 300.2. The image pixel array 300.1 can be denoted as "$I_1(x,y)$", where $I_1(x,y)=I(x,y)$ $0 \leq x \leq (Sx-1)$, and $0 \leq y \leq (Sy-2)$ Further, the image pixel array 300.2 can be denoted as "$I_2(x,y)$", where $I_2(x,y)=I(x,y+1)$, $0 \leq x \leq (Sx-1)$, and $0 \leq y \leq (Sy-2)$.

As a result, the pixels contained in the image pixel array 300.1 (see FIG. 4), and the corresponding pixels contained in the image pixel array 300 (see FIG. 3), are disposed in the same locations within the respective pixel arrays. However, the pixels contained in the image pixel array 300.2 (see FIG. 4) are shifted "up" vertically by one pixel location relative to their corresponding locations in the image pixel array 300 (see FIG. 3). To produce the vertical gradient image array 400, the gradient image array generator 204 subtracts the luminance values of the pixels contained in the image pixel array 300.2 from the luminance values of the pixels disposed at the corresponding pixel locations within the image pixel array 300.1, thereby effectively taking the difference between the luminance values Y of the vertically adjacent pairs of pixels at x,y locations (0,0) and (0,1), (0,1) and (0,2), (0,2) and (0,3), etc., in a first column of the image pixel array 300, the vertically adjacent pairs of pixels at x,y locations (1,0) and (1,1), (1,1) and (1,2), (1,2) and (1,3), etc., in a second column of the image pixel array 300, the vertically adjacent pairs of pixels at x,y locations (2,0) and (2,1), (2,1) and (2,2), (2,2) and (2,3), etc., in a third column of the image pixel array 300, and so on, for the remaining columns of the image pixel array 300. In accordance with this illustrative example, the bit depth is 8. Each luminance value is therefore an integer value in the range of 0 to 255, and each element of the vertical gradient image array 400 can have an integer value in the range of −255 to +255. It is noted, however, that any other suitable value for the bit depth may be employed.

It is noted that, in accordance with one or more alternative embodiments, the gradient image array generator 204 may calculate a gradient image array with reference to a horizontal gradient direction relative to the image pixel array 300 by taking the difference between the luminance or chrominance values of horizontally adjacent pairs of pixels in the pixel array 300, with reference to a main or minor diagonal gradient direction relative to the image pixel array 300 by taking the difference between the luminance or chrominance values of diagonally adjacent pairs of pixels in the pixel array 300, or with reference to any other suitable gradient direction relative to the image pixel array 300 by taking the difference between the luminance or chrominance values of adjacent pairs of pixels in the respective gradient direction.

The resulting vertical gradient image array 400 can be denoted as "D(x,y)", where $0 \leq x \leq (Sx-1)$, and $0 \leq y \leq (Sy-2)$ Further, the operation of taking the difference between the luminance values Y of vertically adjacent pairs of pixels in the image pixel array 300 can be expressed as $D(x,y)=I(x,y)-I(x,y+1)$, where $0 \leq x \leq (Sx-1)$, and $0 \leq y \leq (Sy-2)$.

Using the data from the vertical gradient image array 400 (see FIG. 4), the transition probability matrix generator 206 (see FIG. 2) can construct a transition probability matrix for the probabilities of elements in the vertical gradient image array 400 being equal to respective specified values (each referred to herein in turn as a "current state" of the system), while vertically adjacent elements in the vertical gradient image array 400 are equal to the same or different specified values (each referred to herein in turn as a "next state" of the system). In this example, the current states of the system are denoted as "$T_1$", "$T_2$", "$T_3$", and so on, to "$T_N$", and the corresponding next states of the system are denoted as "$H_1$", "$H_2$", "$H_3$", and so on, to "$H_N$", respectively.

As shown in FIG. 2, the transition probability matrix generator 206 includes a first functional component 206.1 for estimating the transition probability that the current state of the system is equal to $T_1$ while the next state of the system is equal to $H_1$, a second functional component 206.2 for estimating the transition probability that the current state of the system is equal to $T_2$ while the next state of the system is equal to $H_2$, and so on, to an N-th functional component 206.N for estimating the transition probability that the current state of the system is equal to $T_N$ while the next state of the system is equal to $H_N$. In this example, the transition probability of the current state being equal to $T_1$ while the next state is equal to $H_1$ is denoted as "$Pr_{T1 \rightarrow H1}$", the transition probability of the current state being equal to $T_2$ while the next state is equal to $H_2$ is denoted as "$Pr_{T2 \rightarrow H2}$", the transition probability of the current state being equal to $T_3$ while the next state is equal to $H_3$ is denoted as "$Pr_{T3 \rightarrow H3}$", and so on, and the transition probability of the current state being equal to $T_N$ while the next state is equal to $H_N$ is denoted as "$Pr_{TN \rightarrow HN}$". The process of obtaining the transition probability estimates $\Pr_{T1 \to H1}$, $\Pr_{T2 \to H2}$, $\Pr_{T3 \to H3}$, ..., $\mathrm{PR}_{TN \to HN}$ from the data contained in the vertical gradient image array 400 is graphically illustrated with reference to FIG. 5, where the transition probabilities are estimated between respective pairs of state values for adjacent x,y locations disposed in the vertical gradient direction (as depicted by reference numerals 501 to 536) throughout the gradient image array 400.

More specifically, the transition probability estimate $\Pr_{T1 \to H1}$ can be expressed as $$Pr_{T_1 \to H_1} = Pr(D(x, y+1) = H_1 \mid D(x, y) = T_1) = \quad (1)$$
$$\frac{Pr(D(x, y) = T_1, D(x, y+1) = H_1)}{Pr(D(x, y) = T_1)}.$$

It is noted that equation (1) above can be expanded as $$Pr_{T_1 \to H_1} = \frac{\sum_{x=0}^{S_x-1} \sum_{y=0}^{S_y-3} \delta\{D(x,y) = T_1, D(x, y+1) = H_1\}}{\sum_{x=0}^{S_x-1} \sum_{y=0}^{S_y-3} \delta\{D(x,y) = T_1\}}, \quad (2)$$

where "$\delta\{\cdot\}$" is the Kronecker delta function, which is defined herein as $$\delta\{A\} = \begin{cases} 1, & \text{while condition } A \text{ holds} \\ 0, & \text{otherwise.} \end{cases}$$

It is further noted that each of the remaining transition probability estimates $\Pr_{T2 \to H2}$, $\Pr_{T3 \to H3}$, ..., $\Pr_{TN \to HN}$ can be expressed in formats like those illustrated in equations (1) and (2) above for $\Pr_{T1 \to H1}$.

Accordingly, the functional components 206.1, 206.2, ..., 206.N included in the transition probability matrix generator 206 are operative to estimate the transition probabilities $\Pr_{T1 \to H1}$, $\Pr_{T2 \to H2}$, ..., $\Pr_{TN \to HN}$, respectively, from the data contained in the vertical gradient image array 400. In this example, the transition probabilities $\Pr_{T1 \to H1}$ to $\Pr_{TN \to HN}$ can be arranged in the form of a transition probability matrix.

Figure 6:
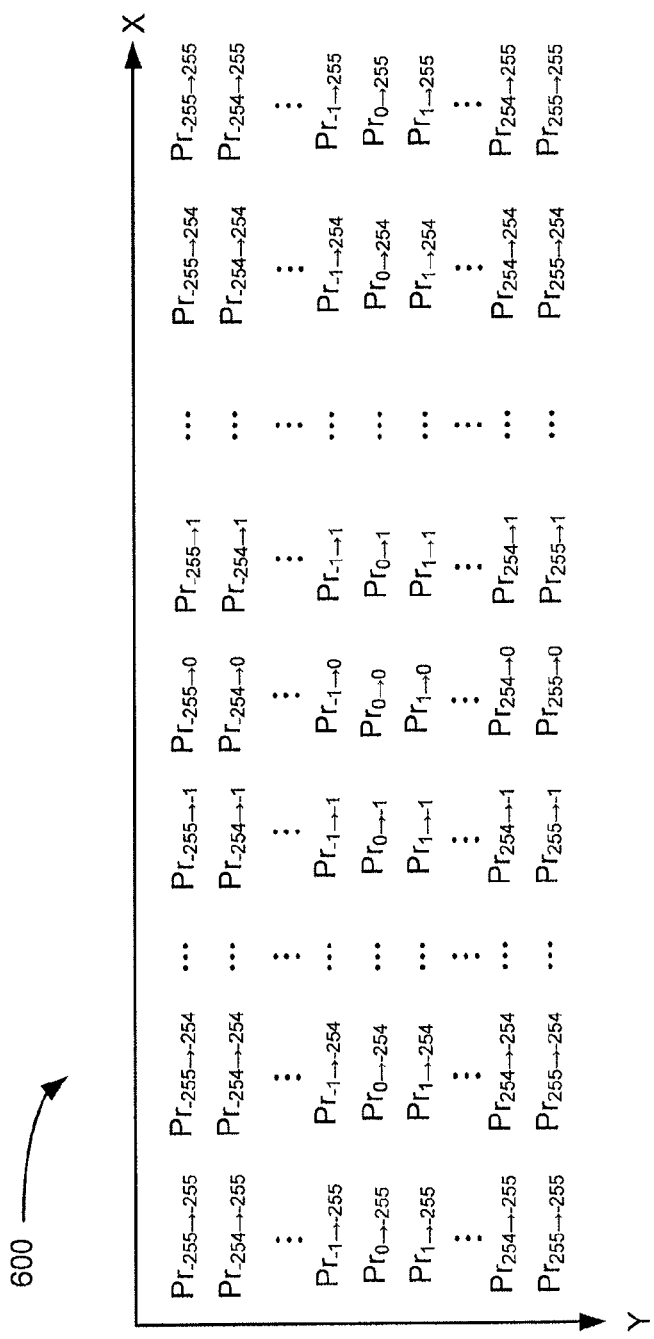
FIG. 6 is a diagram of the exemplary transition probability matrix constructed by the systems of FIGS. 1 and 2.

FIG. 6 depicts an exemplary transition probability matrix 600 constructed from the data contained in the vertical gradient image array 400. With regard to a first column of the transition probability matrix 600, the transition probability denoted as $\Pr_{255 \to 255}$ corresponds to the transition probability $\Pr_{T1 \to H1}$ the transition probability denoted as $\Pr_{254 \to 255}$ corresponds to the transition probability $\Pr_{T2 \to H2}$, and so on, for the remaining transition probabilities in the first column of the matrix 600. The transition probabilities are denoted as illustrated in FIG. 6 for the remaining columns of the transition probability matrix 600, including the final column where the transition probability denoted as $\Pr_{255255}$ corresponds to the transition probability $\Pr_{TN \to HN}$. As described above, each luminance value is an integer value in the range of 0 to 255 (for a bit depth of 8), and therefore each element of the vertical gradient image array 400 can have an integer value in the range of −255 to +255. Accordingly, the dimensions of the transition probability matrix 600 constructed from the data contained in the vertical gradient image array 400 can be 511×511.

It is noted that in the vertical gradient image array 400, vertically adjacent elements are correlated to each other, with the strength of the correlation decreasing as the distance between the respective elements increases. Further, due to the perceived spreading of edges in the given digital image, the positive-valued elements of the vertical gradient image array 400 calculated from the pixel data of the digital image will tend to have an increased number of adjacent elements with positive values, while the negative-valued elements of the vertical gradient image array 400 will tend to have an increased number of adjacent elements with negative values. As a result, in the transition probability matrix 600 constructed from the vertical gradient image data, the transition probability between the current state and the next state of the system will tend to increase where the current state and the next state both have positive values or negative values. Such an increase in transition probability correlates with the degree of image blur in the given digital image.

The data corresponding to the transition probabilities $\Pr_{T1 \to H1}$, $\Pr_{T2 \to H2}$, ..., $\Pr_{TN \to HN}$ generated by the functional components 206.1, 206.2, ..., 206.N, respectively, included in the transition probability matrix generator 206 are provided to the transition probability data pooling component 208, which pools the transition probability data using any suitable technique of pooling data. As described above, the dimensions of the transition probability matrix 600 constructed from the vertical gradient image array 400 can be 511×511. In accordance with this illustrative example, because up to 3 image pixel arrays may be generated from the luminance and chrominance components Y, U, and V (or Y, Cb, and Cr) of the given digital image, and, for each of those three image pixel arrays, up to 4 or more gradient image arrays may be generated with reference to the vertical gradient direction, the horizontal gradient direction, the main diagonal gradient direction, the minor diagonal gradient direction, and/or any other suitable gradient direction relative to the respective image pixel array, the total number of transition probabilities associated with the given digital image can be as high as

511×511×3×4=3,133,452, or higher, significantly increasing the computational complexity of the image blur measurement.

In this example, an empirical approach can be employed to reduce the computational complexity of the image blur measurement, including selecting a limited number of state pairs $H_n$ (where "n" is an integer value in the range of 1 to N), estimating the transition probabilities between those selected state pairs $T_n$, $H_n$, and pooling or accumulating the estimated transition probability data using any suitable technique of pooling or accumulating data. Specifically, it was described above with reference to the transition probability matrix 600 that the transition probability between the current state and the next state of the system will tend to increase where the current state and the next state both have positive values or negative values. It was further described above that such increases in transition probabilities correlate with the degree of image blur in the given digital image. Accordingly, to reduce computational complexity, the transition probability matrix generator 206 can select a limited number of state pairs $T_n$, $H_n$, for use in calculating the transition probabilities for the transition probability matrix 600, such that each selected pair of states has two positive-valued elements or two negative-valued elements.

For example, using this exemplary empirical approach, the transition probability matrix generator 206 can select four state pairs $T_n$, $H_n$, where the current state $T_n$, and the next state $H_n$, of the system both have positive values or negative values, for example, $$(J,K), (K,J), (-J,-K), \text{ and } (-K,-J),$$

where "J" and "K" can each have an integer value in the range of −255 to +255. Further, the transition probability matrix generator 206 can estimate the transition probabilities $Pr_{J \to K}$, $Pr_{K \to J}$, $Pr_{-J \to -K}$, and $Pr_{-K \to -J}$ for the current and next states (J,K), (K,J), (−J,−K), and (−K,−J) of the system, respectively.

Moreover, the transition probability data pooling component 208 can pool the transition probability data using an exemplary data pooling technique defined according to the expression $$\text{BLUR} = (Pr_{J \to K})^r + (Pr_{K \to J})^r + (Pr_{-J \to -K})^r + (Pr_{-K \to -J})^r,$$

where "BLUR" represents a quantitative measurement of image blur in the given digital image, and "r" is a parameter whose value can be adjusted to accommodate the best correlation to some subjective assessment of the image blur in the given digital image. For example, the value of the current state J of the system may be equal to 3 or any other suitable value, the value of the next state K of the system may be equal to 2 or any other suitable value, and the value of the parameter r may be set to 2.331 or any other suitable value. It is noted that the four selected state pairs $(T_n, H_n)$, where the current state $T_n$, and the next state $H_n$, of the system are (J,K), (K,J), (−J,−K), and (−K,−J), respectively, are discussed above for purposes of illustration only, and that any other suitable number of state pairs $(T_n, H_n)$, and any other suitable values for the current state $T_n$, and the next state $H_n$, of the system, may be employed.

It is noted that in accordance with one or more alternative embodiments, the transition probability data pooling component 208 may employ a regression analysis technique or any other suitable technique of pooling or accumulating data. For example, the transition probability data pooling component 208 may employ a regression analysis technique based on an artificial neural network, as described in BOOSTING FEATURE SELECTION FOR NEURAL NETWORK BASED REGRESSION, authored by Kevin Bailly and Maurice Milgram, and published in Neural Networks 22 (2009), pages 748-756. In this way, the transition probability data pooling component 208 can determine the relationship between some subjective assessment of the image blur in the given digital image and the transition probabilities between the current and next states $(T_n, H_n)$ in the transition probability matrix, and obtain a quantitative measurement of image blur in the given digital image based at least in part on that determined relationship.

It is further noted that in accordance with one or more alternative embodiments, the transition probability data pooling component 208 may employ any suitable feature selection technique for removing any possibly irrelevant and/or redundant transition probabilities from the transition probability matrix, as appropriate, thereby reducing computational complexity. For example, the transition probability data pooling component 208 may employ a so-called "boosting" feature selection approach, as described in the above-referenced publication authored by Kevin Bailly and Maurice Milgram. The transition probability data pooling component 208 provides the quantitative measurement of image blur (BLUR) to the image blur measurement output generator 210, which provides an indication of the image blur measurement as output using any suitable output component or device.

An illustrative method 700 of performing quantitative measurements of image blur in digital images and digital image sequences is described below with reference to FIG. 7.

Figure 7:
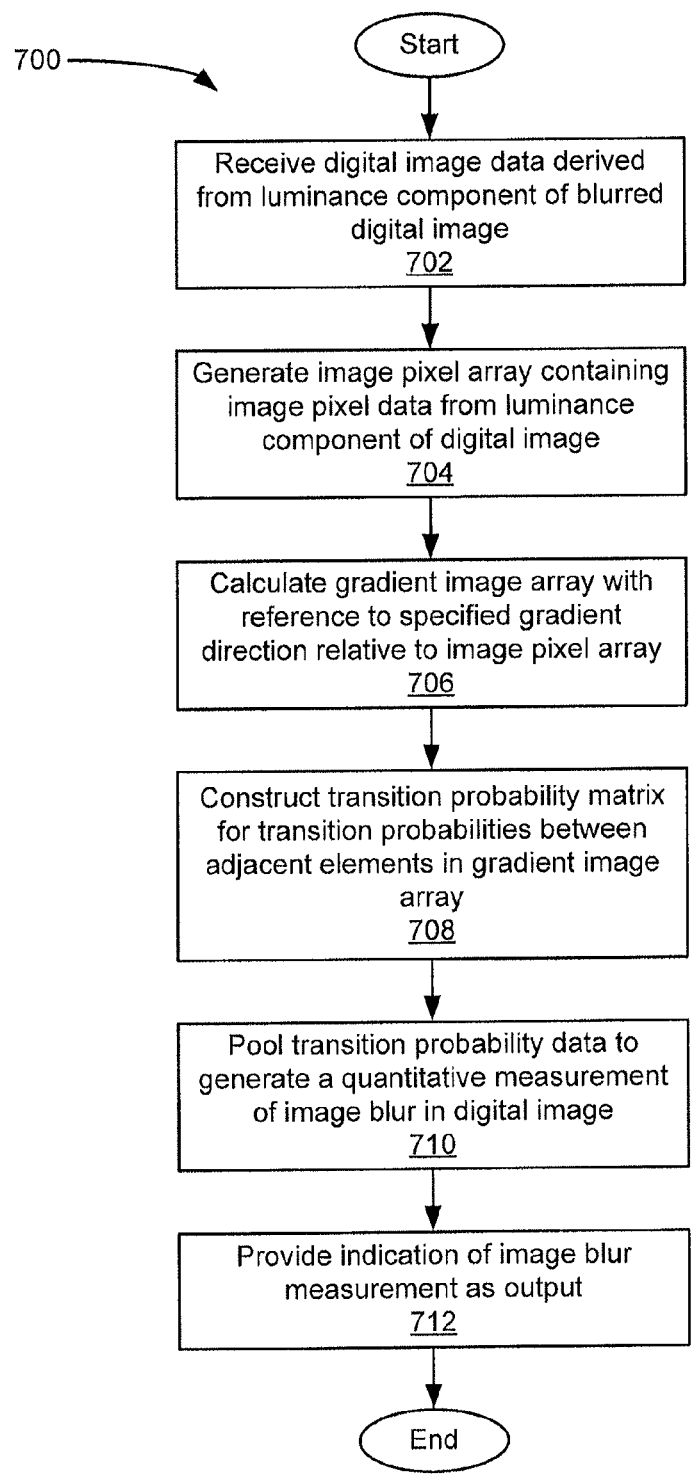
FIG. 7 is a flow diagram illustrating an exemplary method of performing a quantitative measurement of image blur in a given digital image, according to an exemplary embodiment of the present application.

It is noted that the illustrative method 700 of FIG. 7 can be performed, for example, by using the system 100 of FIG. 1. As depicted in step 702 (see FIG. 7), digital image data derived from the luminance component Y of a given digital image is received by the image pixel array generator 102 (see FIG. 1). As depicted in step 704, a 2-dimensional image pixel array containing image pixel data is generated by the image pixel array generator 102 from the luminance component Y of the given digital image. As depicted in step 706, a gradient image array is calculated with reference to a specified gradient direction relative to the image pixel array by the gradient image array generator 104. Using the data from the gradient image array, a transition probability matrix is constructed by the transition probability matrix generator 106 for the transition probabilities between adjacent elements in the gradient image array, as depicted in step 708. As depicted in step 710, the transition probability data is pooled by the transition probability data pooling component 108 to generate a quantitative measurement of image blur in the given digital image. As depicted in step 712, an indication of the image blur measurement is provided as output by the image blur measurement output generator 110, using any suitable output component or device.

By performing the measurement of image blur in a given digital image using a Markov Chain, where a gradient image array is calculated for a pixel array derived from the given digital image, and a transition probability matrix is constructed for the transition probabilities between adjacent elements in the gradient image array, the presently disclosed systems and methods can obtain a quantitative measurement of image blur in the given digital image by pooling or otherwise accumulating the transition probability data contained in the transition probability matrix. The resulting image blur measurement can be obtained in a computationally efficient manner, without employing any reference information in the measurement process.

It will be appreciated by those of ordinary skill in the art that one or more of the functions necessary to implement the above-described systems and methods of performing quantitative measurements of image blur in digital images and digital image sequences can be embodied—in whole or in part—in hardware, software, or some suitable combination of hardware and software, using programmable micro-controllers, microprocessors, digital signal processors, and/or logic arrays, read-only memory (ROM), random access memory (RAM), CD-ROM, personal computers and computer displays, and/or any other suitable hardware and/or software programs, components, and/or devices.

It will be further appreciated by those skilled in the art that modifications to and variations of the above-described systems and methods may be made without departing from the inventive concepts disclosed herein. Accordingly, the invention should not be viewed as limited except as by the scope and spirit of the appended claims.

What is claimed is:

1. A system for measuring image blur in a digital image, the digital image having luminance and chrominance components, the system comprising:
   at least one memory; and
   at least one processor operative to execute at least one computer program out of the at least one memory:
   to generate, from at least one of the luminance and chrominance components of the digital image, image pixel data in an image pixel array corresponding to the digital image, the image pixel array having a plurality of pixel locations for pixel values of the image pixel data;

to calculate gradient image data in a gradient image array from the image pixel data, the gradient image data representing a plurality of states, the gradient image array having a plurality of state locations for state values of the gradient image data, each of the state values corresponding to a respective gradient value calculated in a specified direction for a respective pair of adjacent pixel locations in the image pixel array;

to estimate a plurality of transition probabilities between respective pairs of state values for adjacent state locations disposed in the specified direction throughout the gradient image array;

to pool data corresponding to the plurality of transition probabilities to generate a measurement of image blur in the digital image; and to generate an output indicative of the measurement of image blur in the digital image.

2. The system of claim 1 wherein the specified direction corresponds to one of a vertical direction, a horizontal direction, a main diagonal direction, and a minor diagonal direction.

3. The system of claim 1 wherein the at least one processor is further operative to execute the at least one computer program out of the at least one memory to select a number of state pairs for use in estimating the plurality of transition probabilities.

4. The system of claim 3 wherein each of the selected state pairs comprises two positive state values or two negative state values.

5. The system of claim 3 wherein the at least one processor is further operative to execute the at least one computer program out of the at least one memory to select the state pairs using a feature selection technique.

6. The system of claim 5 wherein the feature selection technique comprises a boosting feature selection technique.

7. The system of claim 1 wherein the at least one processor is further operative to execute the at least one computer program out of the at least one memory to pool the data corresponding to the plurality of transition probabilities using a regression analysis technique.

8. The system of claim 7 wherein the regression analysis technique comprises a neural network-based regression analysis technique.

9. The system of claim 1 wherein the digital image comprises a digital still image conforming to the JPEG standards.

10. The system of claim 1 wherein the digital image comprises a single digital image of an image sequence conforming to the MPEG or ITU-T H.26n standards.

11. A method of measuring image blur in a digital image, the digital image having luminance and chrominance components, the method comprising the steps of:

generating, by an image pixel array generator from at least one of the luminance and chrominance components of the digital image, image pixel data in an image pixel array corresponding to the digital image, the image pixel array having a plurality of pixel locations for pixel values of the image pixel data;

calculating, by a gradient image array generator from the image pixel data, gradient image data in a gradient image array, the gradient image data representing a plurality of states, the gradient image array having a plurality of state locations for state values of the gradient image data, each of the state values corresponding to a respective gradient value calculated in a specified direction for a respective pair of adjacent pixel locations in the image pixel array;

estimating, by a transition probability generator, a plurality of transition probabilities between respective pairs of state values for adjacent state locations disposed in the specified direction throughout the gradient image array;

pooling, by a data pooling component, data corresponding to the plurality of transition probabilities to generate a measurement of image blur in the digital image; and generating, by an output generator, an output indicative of the measurement of image blur in the digital image.

12. The method of claim 11 wherein the calculating of the gradient image data includes calculating the gradient image data in the gradient image array, the gradient image array having the plurality of state locations for the state values, each of the state values corresponding to the respective gradient value calculated in the specified direction for the respective pair of adjacent pixel locations in the image pixel array, the specified direction corresponding to one of a vertical direction, a horizontal direction, a main diagonal direction, and a minor diagonal direction.

13. The method of claim 11 further including selecting a number of state pairs for use in estimating the plurality of transition probabilities.

14. The method of claim 13 wherein each of the selected state pairs comprises two positive state values or two negative state values.

15. The method of claim 13 wherein the selecting of the number of state pairs includes selecting the state pairs using a feature selection technique.

16. The method of claim 15 wherein the feature selection technique comprises a boosting feature selection technique.

17. The method of claim 11 wherein the pooling of the data corresponding to the plurality of transition probabilities comprises pooling the data corresponding to the plurality of transition probabilities using a regression analysis technique.

18. The method of claim 17 wherein the regression analysis technique comprises a neural network-based regression analysis technique.

19. The method of claim 11 wherein the digital image comprises a digital still image conforming to the JPEG standards.

20. The method of claim 11 wherein the digital image comprises a single digital image of an image sequence conforming to the MPEG or ITU-T H.26n standards.

21. A system for measuring image blur in a digital image, the digital image having luminance and chrominance components, the system comprising:

at least one memory; and at least one processor operative to execute at least one computer program out of the at least one memory:

to generate, from at least one of the luminance and chrominance components of the digital image, image pixel data in an image pixel array corresponding to the digital image, the image pixel array having a plurality of pixel locations for pixel values of the image pixel data;

to calculate gradient image data in a gradient image array from the image pixel data, the gradient image data representing a plurality of states, the gradient image array having a plurality of state locations for state values of the gradient image data, each of the state values corresponding to a respective gradient value calculated in a specified direction for a respective pair of adjacent pixel locations in the image pixel array;

to estimate a plurality of transition probabilities between respective pairs of state values for adjacent state locations disposed in the specified direction throughout the gradient image array, each respective pair of state values including a current state value and a next state value, each of the adjacent state locations including a first state location and a second state location, each of the plurality of transition probabilities being a ratio of a co-occurrence probability that, when the current state value is disposed in the first state location, the next state value is disposed in the second state location, and an occurrence probability that the current state value is disposed in the first state location;

to pool data corresponding to the plurality of transition probabilities to generate a measurement of image blur in the digital image; and to generate an output indicative of the measurement of image blur in the digital image.

* * * * *